Figure 24:
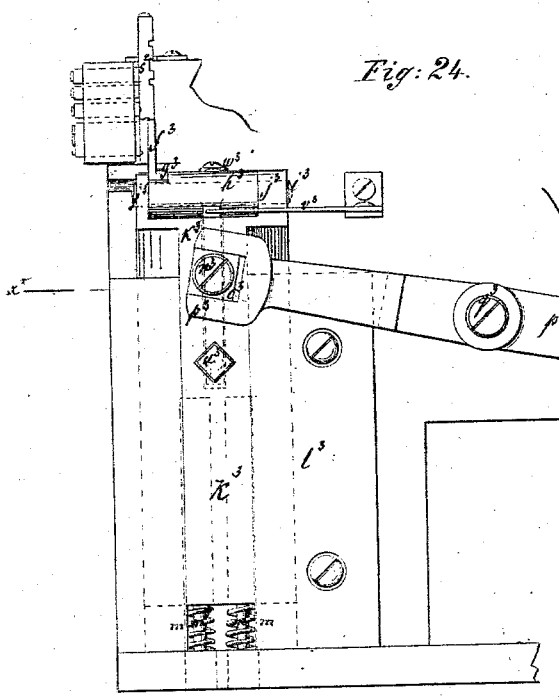

JOHN T. SLINGERLAND.
Improvement in Type-Distributing Machines.
No. 115,777. Patented June 6, 1871.
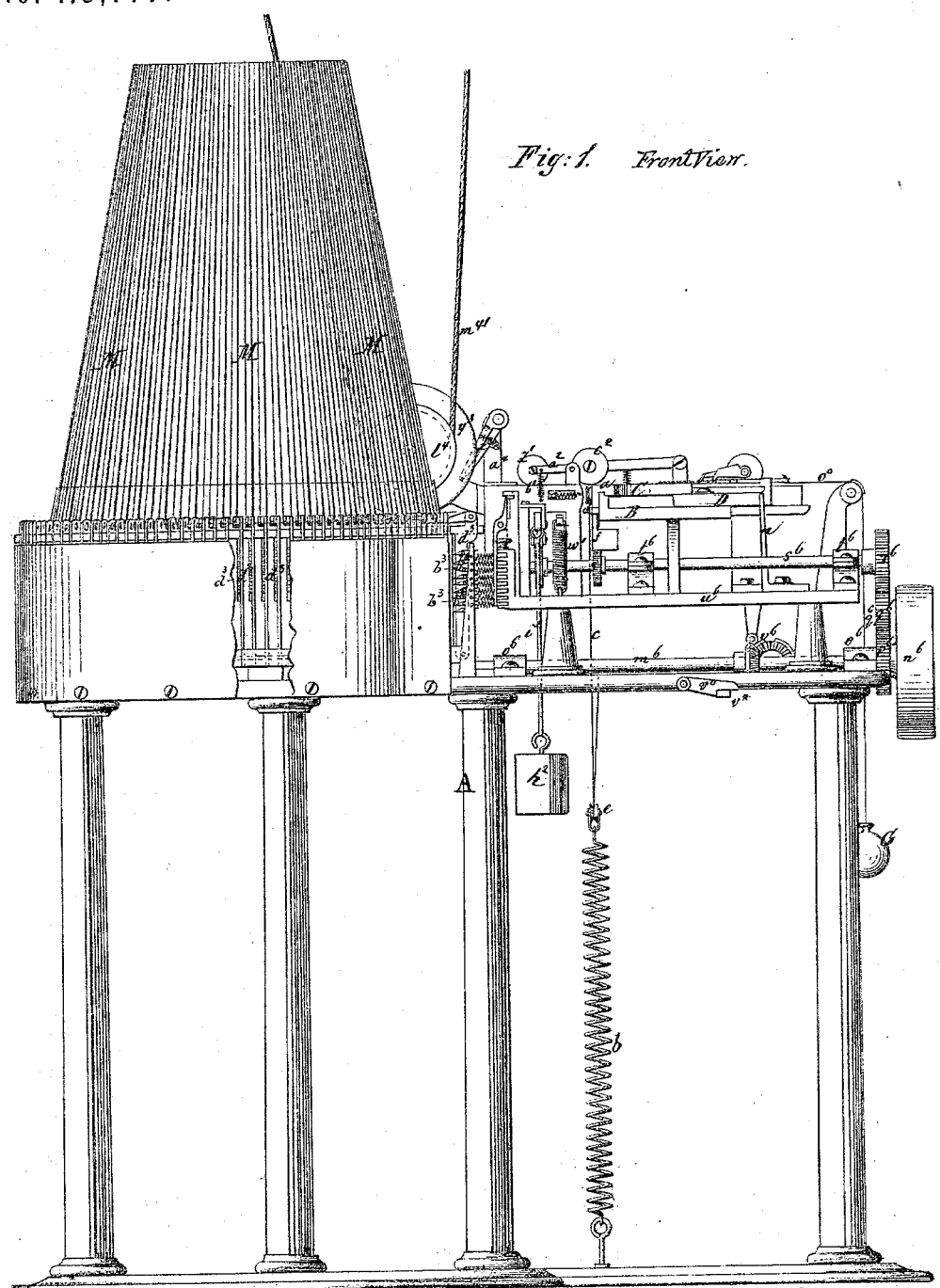
Fig. 1. Front View.

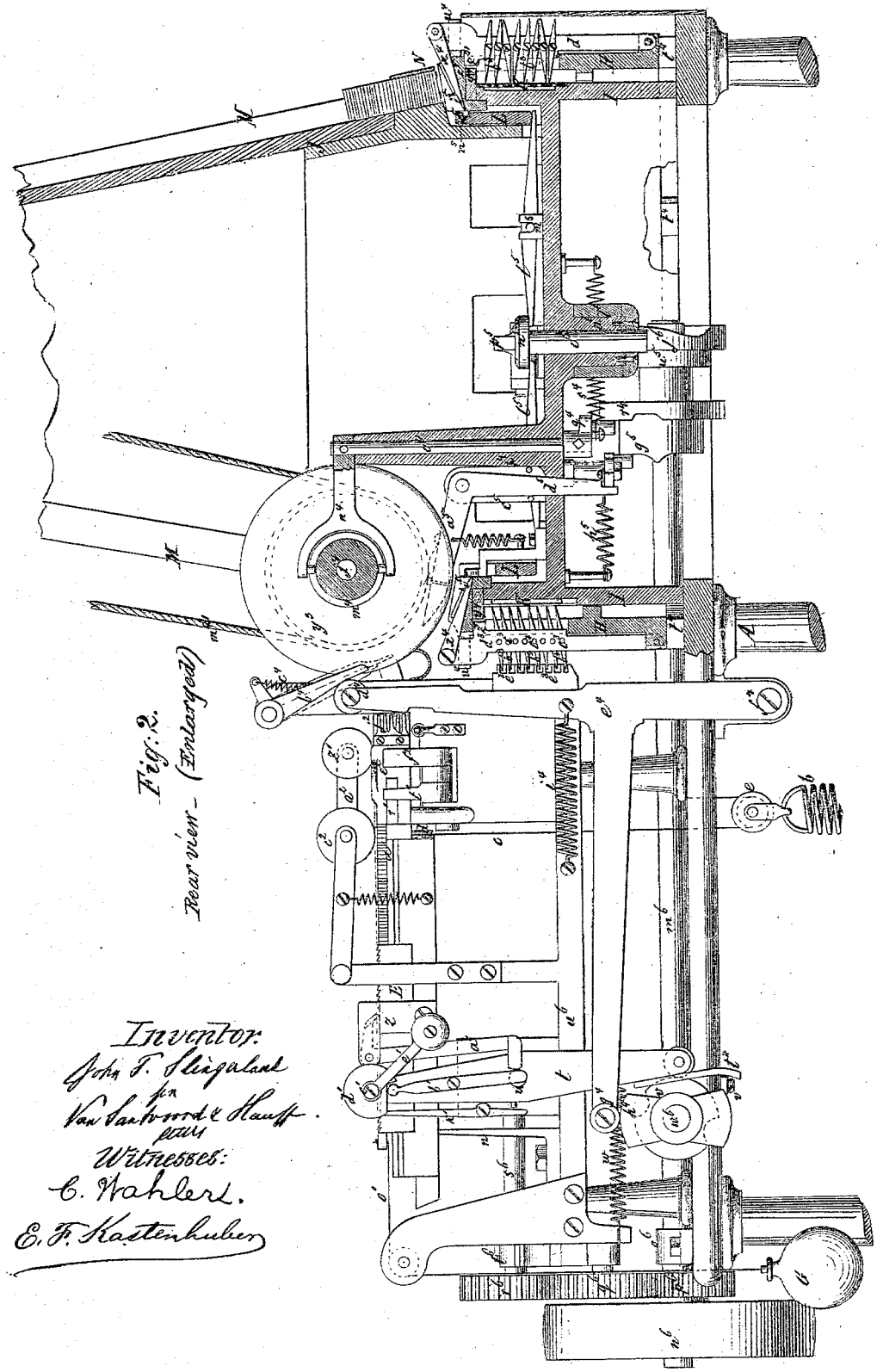

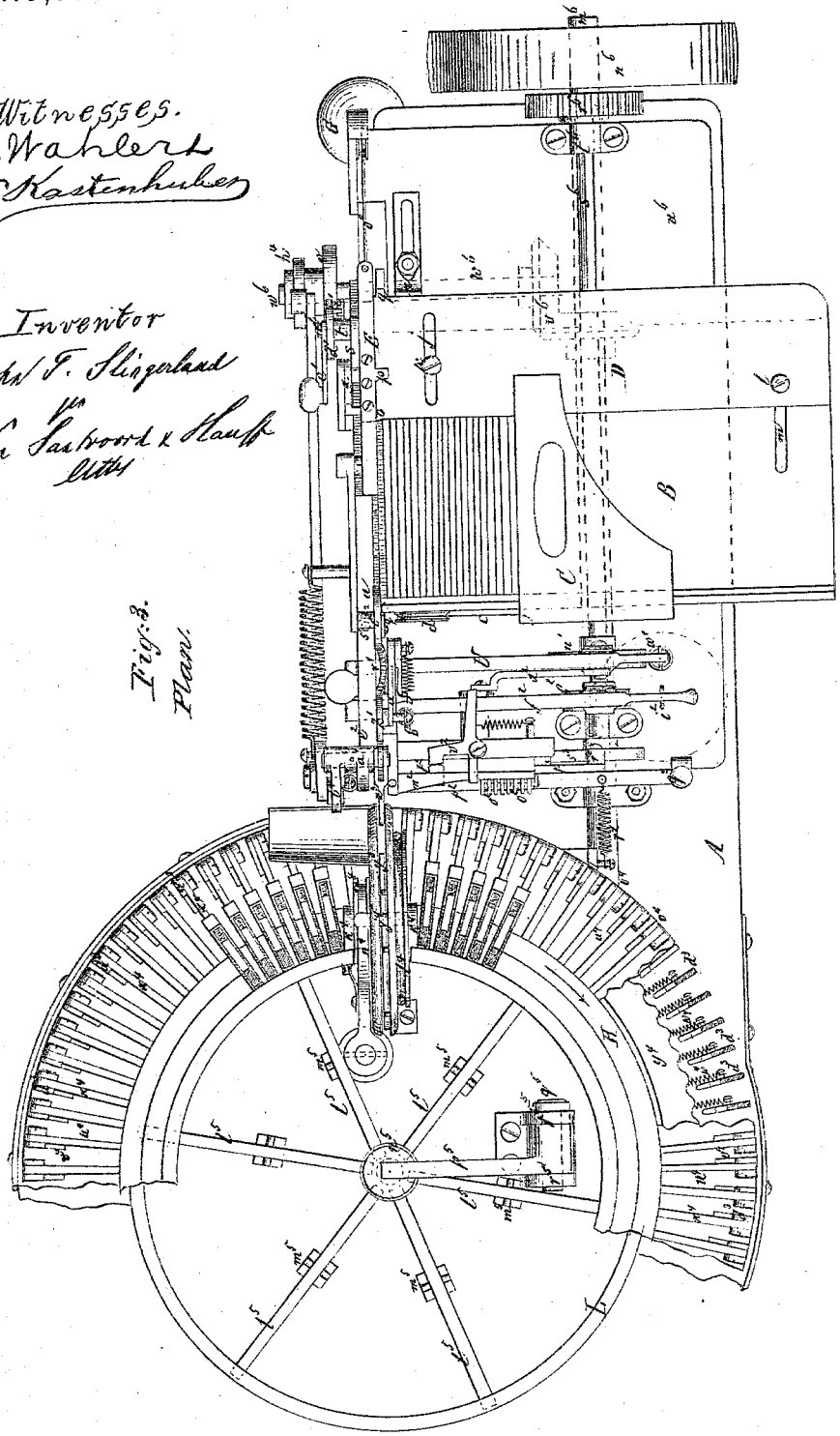

12 Sheets--Sheet 4.
JOHN T. SLINGERLAND.
Improvement in Type-Distributing Machines.
No. 115,777.    Patented June 6, 1871.
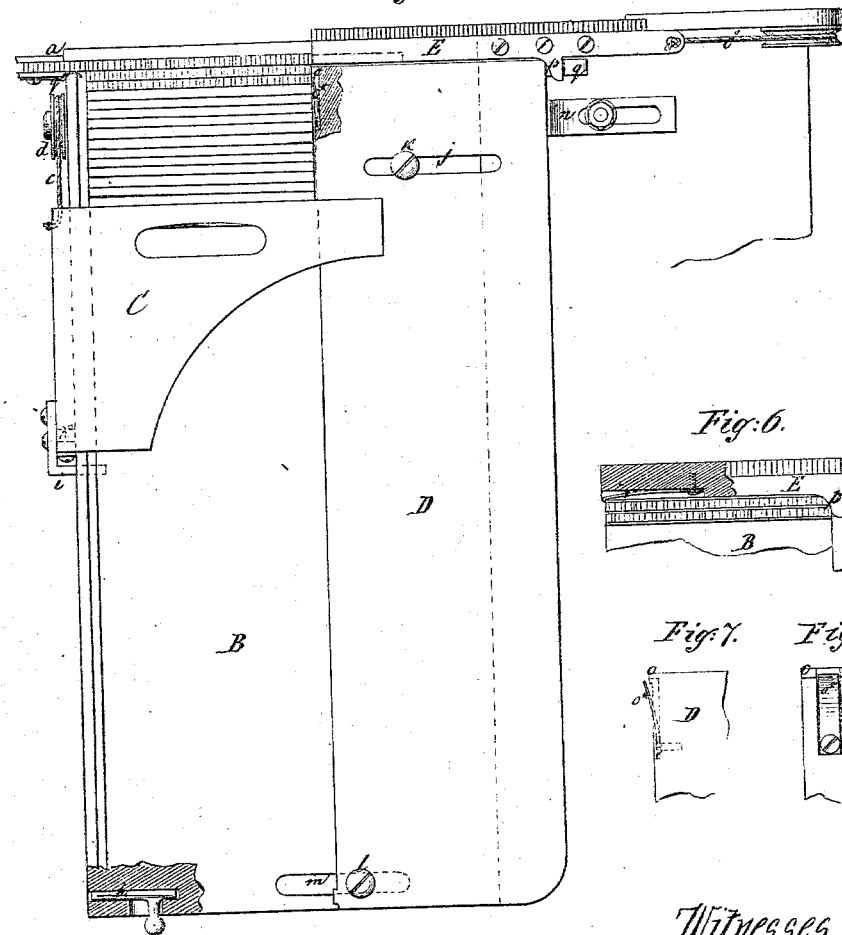
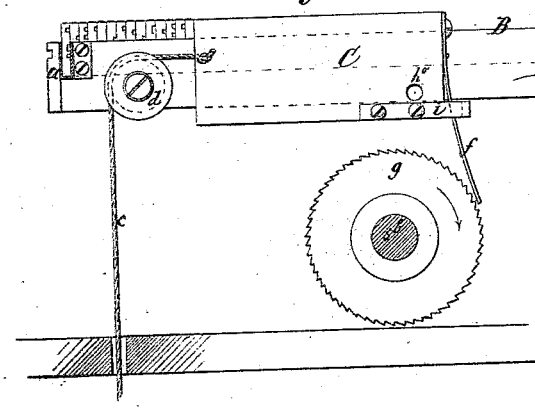
Witnesses.
C. Wahlers
E. F. Kastenhuber
Inventor.
John T. Slingerland
per
Van Santvoord & Hauff
Attys 12 Sheets--Sheet 5.
JOHN T. SLINGERLAND.
Improvement in Type-Distributing Machines.
No. 115,777. Patented June 6, 1871.
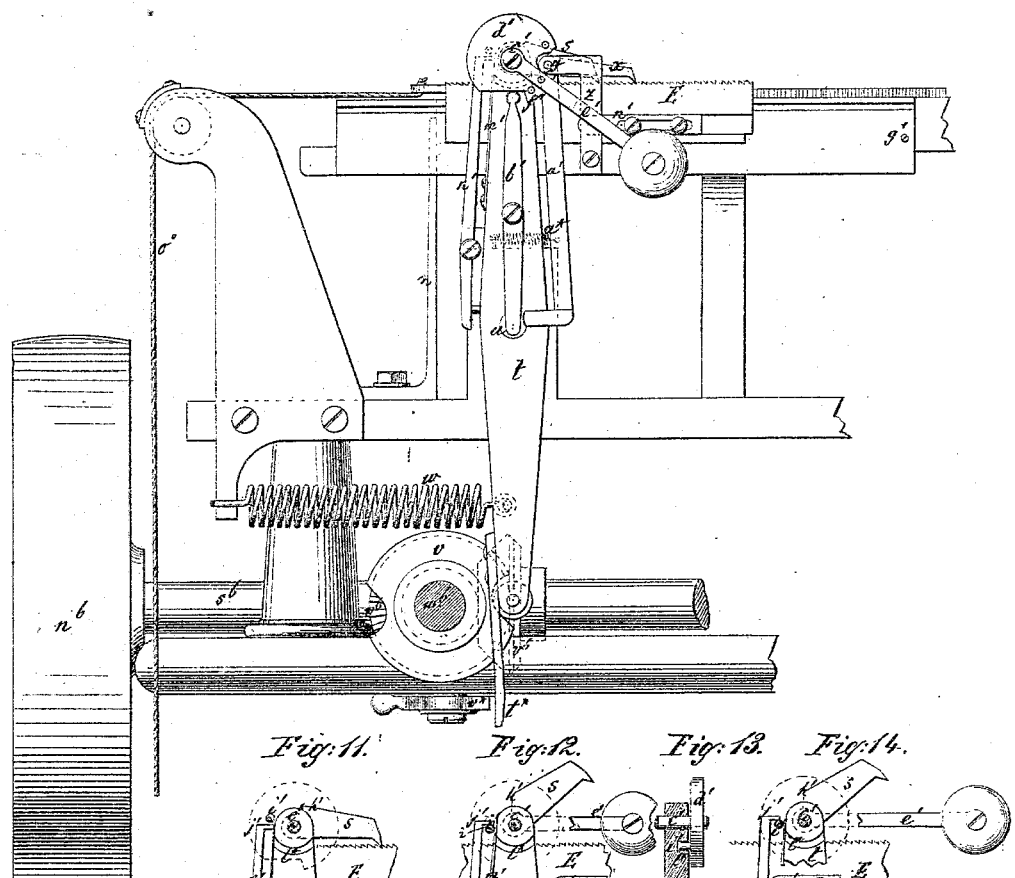
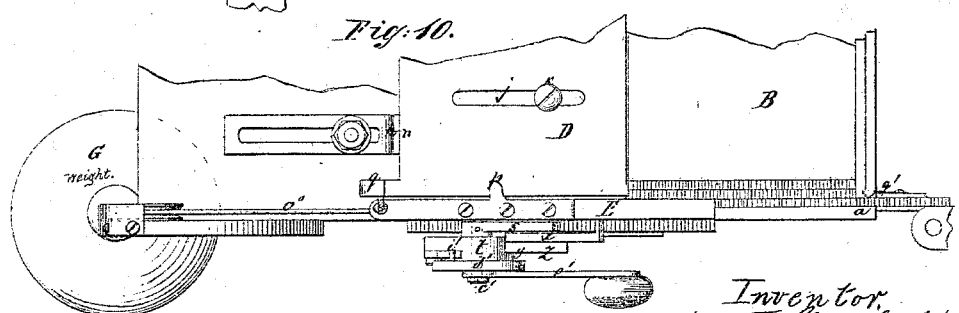
Witnesses.
E. F. Kastenhuber
C. Wahlers.
Inventor
John T. Slingerland
by
Van Santvoord & Hauff
atty 12 Sheets--Sheet 6.
JOHN T. SLINGERLAND.
Improvement in Type-Distributing Machines.
No. 115,777.     Patented June 6, 1871.
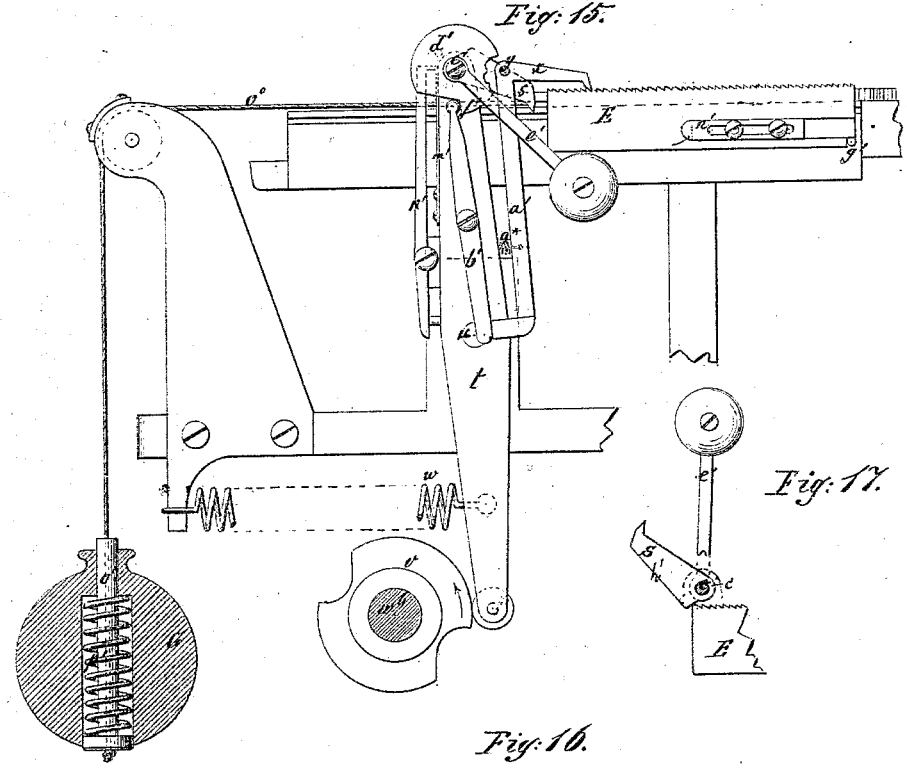
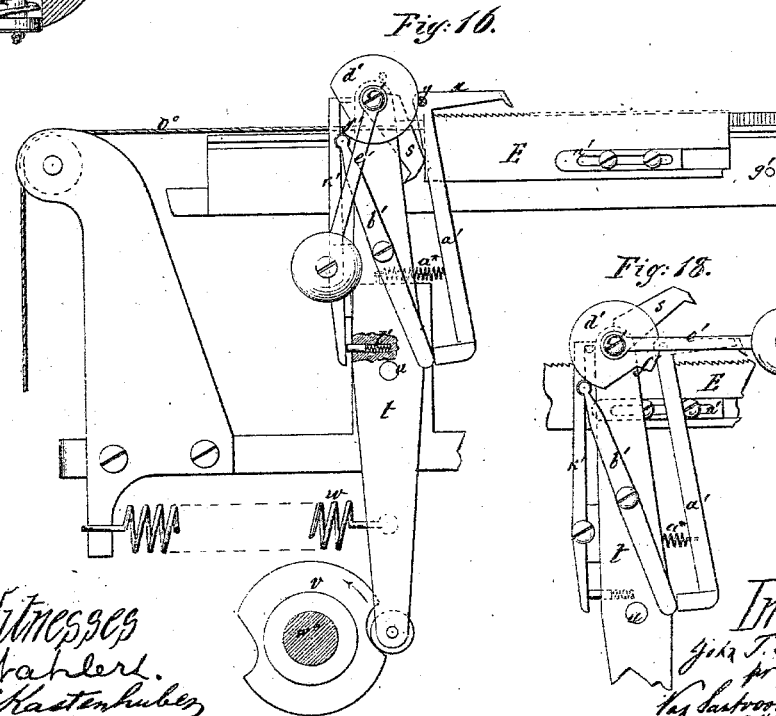
Witnesses
C. Wahlert
E. F. Kastenhuber
Inventor
John T. Slingerland
per
Van Santvoord & Hauff
Atty 12 Sheets--Sheet 7.
JOHN T. SLINGERLAND.
Improvement in Type-Distributing Machines.
No. 115,777. Patented June 6, 1871.
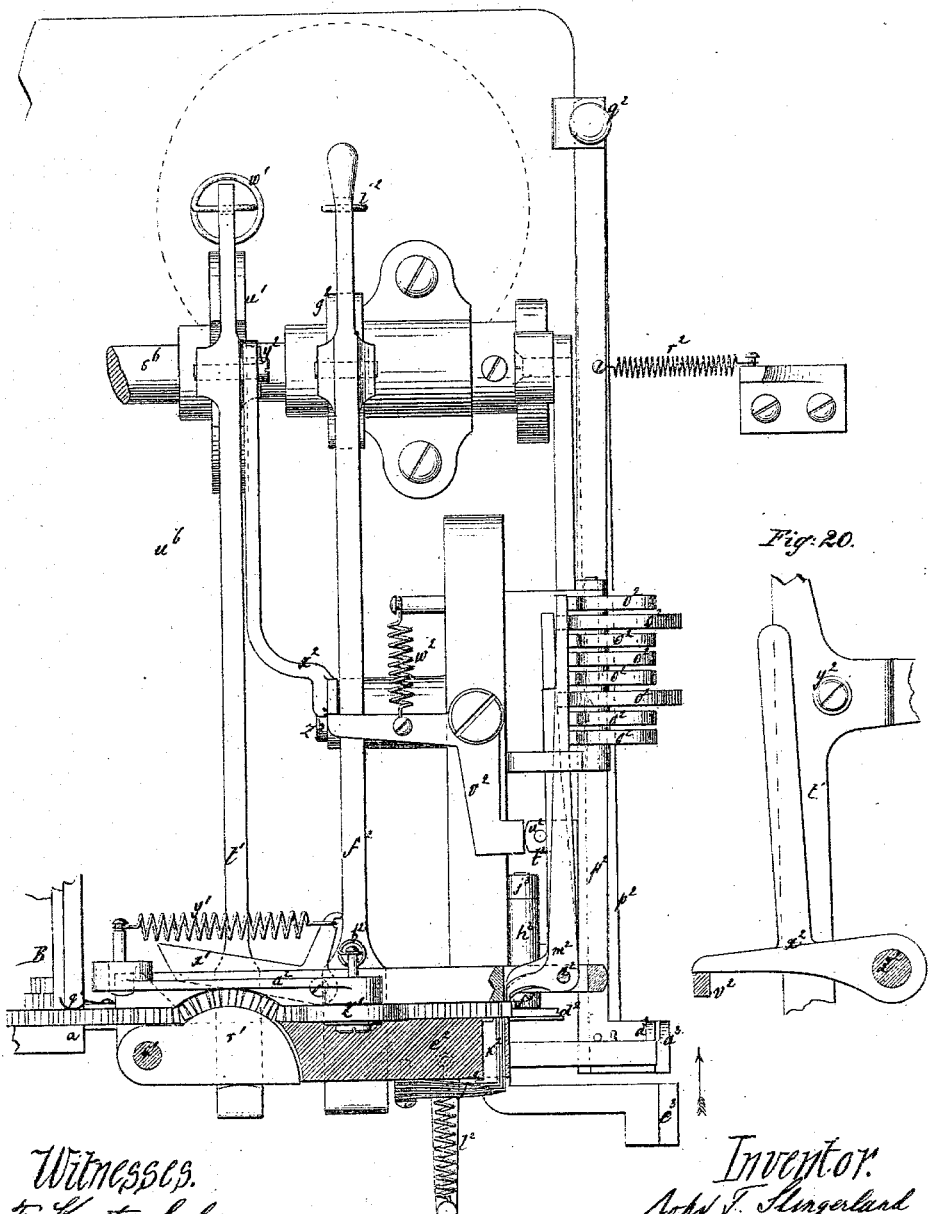

12 Sheets--Sheet 8.
JOHN T. SLINGERLAND.
Improvement in Type-Distributing Machines.
No. 115,777.
Patented June 6, 1871.
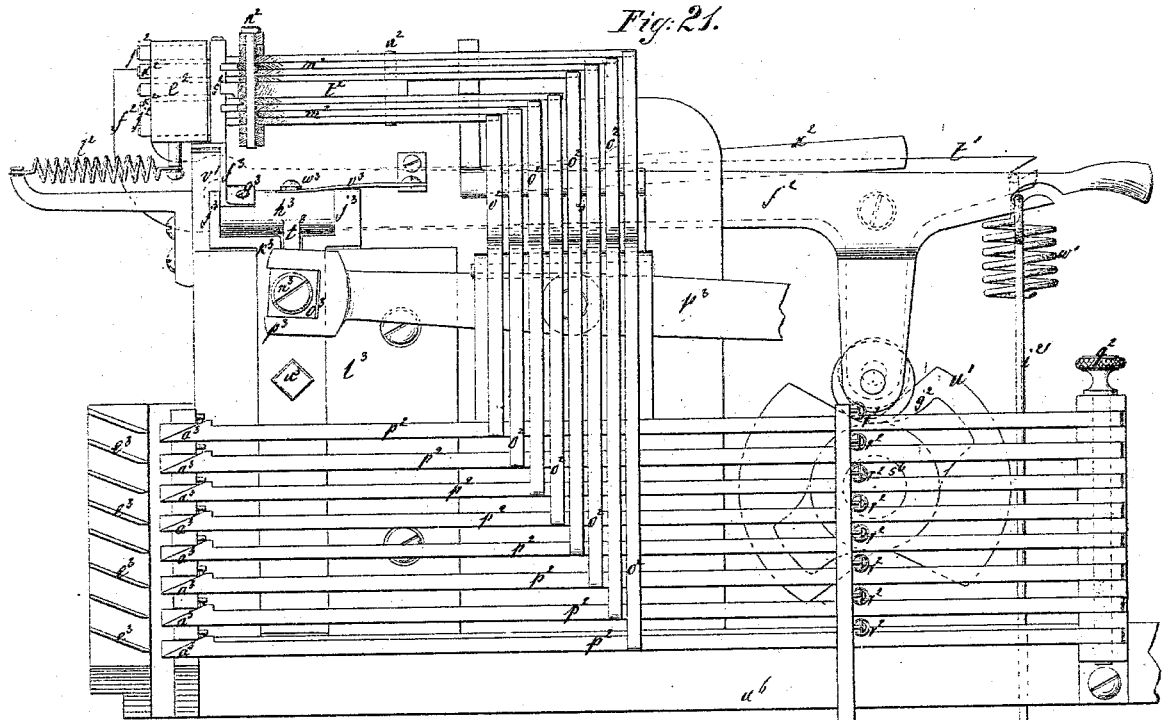
*Fig. 21.*
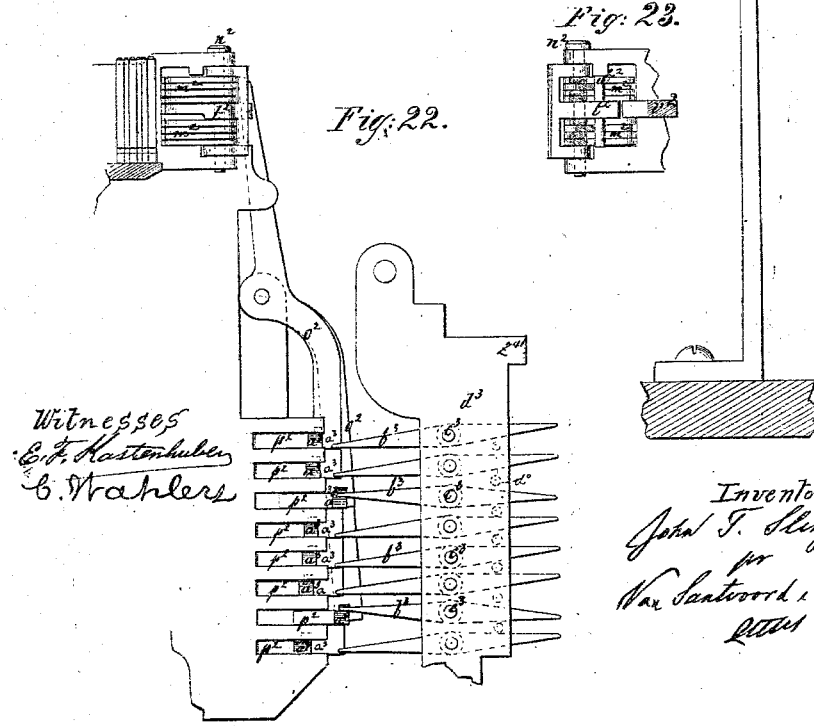
*Fig. 22.*
*Fig. 23.*
Witnesses
E. F. Kastenhuber
C. Wahlers
Inventor
John T. Slingerland
per
Van Santvoord & Hauff
Attys 12 Sheets--Sheet 9.

JOHN T. SLINGERLAND.
Improvement in Type-Distributing Machines.

No. 115,777.

Patented June 6, 1871.

Witnesses.
E. F. Kastenhuber
E. Wahlers

Inventor.
John T. Slingerland
by
Van Santvoord & Hauff
Attys

12 Sheets—Sheet 10.

JOHN T. SLINGERLAND.
Improvement in Type-Distributing Machines.

No. 115,777.  Patented June 6, 1871.

12 Sheets--Sheet 11.
JOHN T. SLINGERLAND.
Improvement in Type-Distributing Machines.
No. 115,777. Patented June 6, 1871.
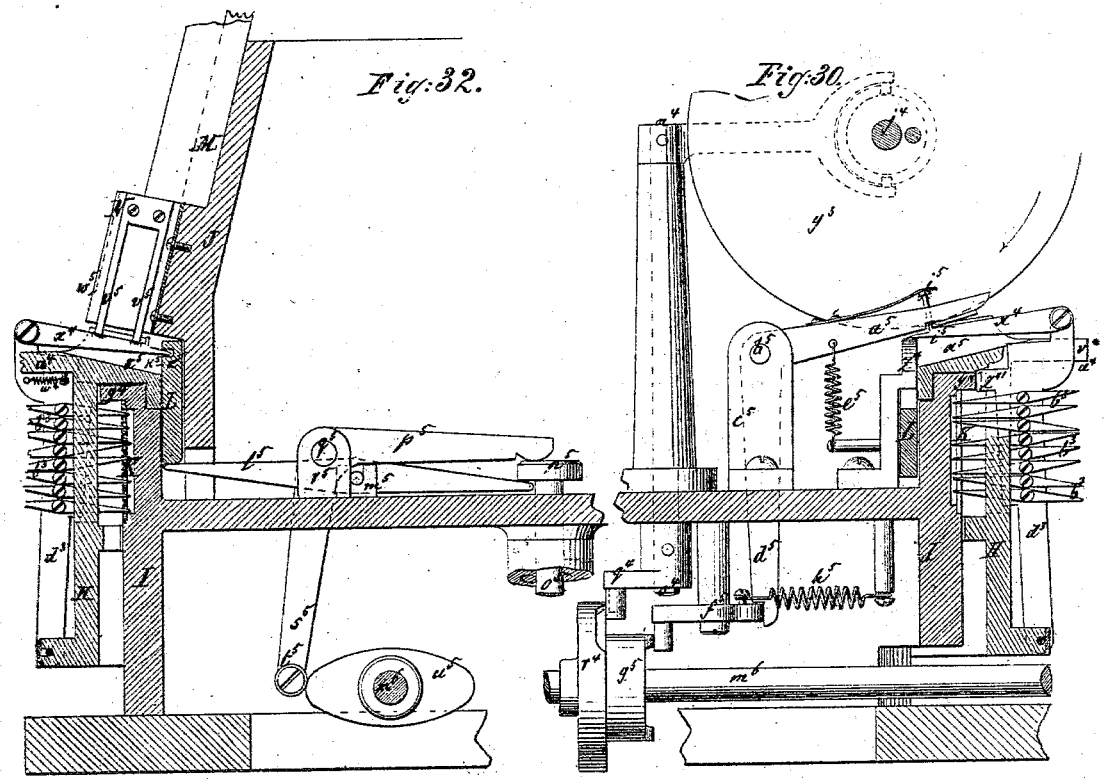
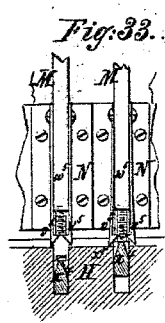
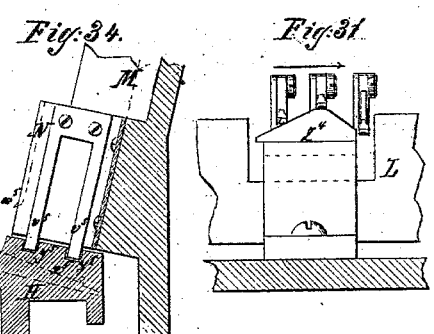
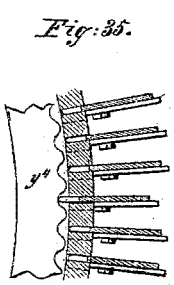
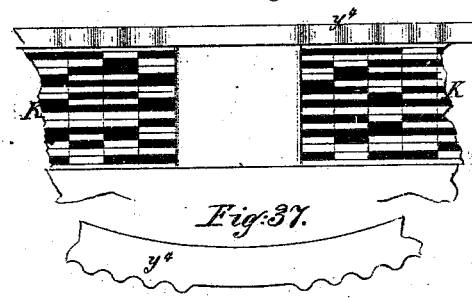
Witnesses.
E. F. Kastenhuber
C. Waheers
Inventor.
John T. Slingerland
per
Van Santvoord & Hauff
atty 12 Sheets--Sheet 12.

JOHN T. SLINGERLAND.
Improvement in Type-Distributing Machines.

No. 115,777. Patented June 6, 1871.

Witnesses.
C. Wahler
E. F. Kastenhuber

Inventor.
John T. Slingerland 114,777

UNITED STATES PATENT OFFICE.

JOHN T. SLINGERLAND, OF NEW YORK, N. Y.

IMPROVEMENT IN TYPE-DISTRIBUTING MACHINES.

Specification forming part of Letters Patent No. 115,777, dated June 6, 1871.

*To all whom it may concern:*

Be it known that I, JOHN T. SLINGERLAND, of the city, county, and State of New York, have invented a new and useful Improvement in Machines for Distributing Type; and I do hereby declare the following to be a full, clear, and exact description thereof, which will enable those skilled in the art to make and use the same, reference being had to the accompanying drawing forming part of this specification, in which drawing—

Figure 1 represents a front view of this invention. Fig. 2 is a rear view of the same, partly in section, on a larger scale than the previous figure. Fig. 3 is a plan or top view of the same partly in section. The remaining figures are details, which will be referred to as the description progresses.

Similar letters indicate corresponding parts.

This invention relates to a machine for distributing types, in which the "dead matter," column after column, is placed on a galley, thence fed, line after line, into a channel, from which the types are transferred, one after the other, into suitable cases arranged on the circumference of a cone, as will more fully appear from the following description.

In the drawing, the letter A designates a frame of cast-iron or any other suitable material, which supports on one end the galley, together with the mechanism for feeding the column and the lines, and for transferring the types, one after the other, to the distributing mechanism which occupies the other end of the frame A, as shown in Figs. 1, 2, and 3. B is the galley on which is placed the dead matter to be distributed, one column after the other, and which is provided with a column-feeder, C, (see Figs. 3 and 4,) by which the column is constantly pressed toward the type-channel $a$. The column-feeder is fitted on the edge of the galley, so that it slides thereon with ease, and its action depends upon a spring, $b$, (see Figs. 1 and 2,) which connects with the column-feeder by a catgut cord, $c$, running over a pulley, $d$, (see Figs. 3 and 4;) and I use a spring in preference to a weight because the force of the spring decreases as the matter to be fed forward diminishes, and, consequently, unnecessary pressure on the type is avoided, while the pressure of a weight remains uniform during the entire motion of the feeder, and admits of no graduation as the quantity of matter to be fed diminishes. In using a spring, however, another difficulty arises from the fact that the length of the spring is limited by the height of the frame A, and it is not possible to impart to the column-feeder the required amount of motion with an ordinary coiled spring. This difficulty I have overcome by connecting with the spring a pulley-block, $e$, and carrying the cord $c$ from the column-feeder over the pulley $d$, thence down under the pulley in the pulley-block and up to a fixed point on the frame, as shown in Figs. 1 and 2. By this arrangement the motion produced by the spring is doubled—that is to say, if the spring contracts one inch the column-feeder will move two inches, and a comparatively short spring is sufficient to impart to the column-feeder the required motion. Of course the power of the spring must be doubled in this case, but there is no difficulty in making the spring of any strength which may be desired. To the outer end of the column-feeder is secured a spring, $f$, (see Fig. 5,) and, if the column has been exhausted to within five or six lines, said spring strikes the circumference of a ratchet-wheel, $g$, which is mounted on a revolving shaft, and by these means an alarm is produced, calling the attention of the attendant to the fact that a fresh column will be required in a short time. In the outer edge of the galley is fitted a bolt, $h$, (see Fig. 4;) and, if the column-feeder is drawn clear back, this bolt can be made to catch in a hole, $h^0$, in the column-feeder, as shown in Figs. 4 and 5, and thereby said column-feeder can be retained against the action of its spring, and time is obtained to put in a new column. Instead of the bolt a latch or any other device of a similar nature may be used. The galley is adjusted to the width of the column by means of a side plate, D, (see Figs. 3 and 4,) which is provided with a slot, $j$, to admit a guide-screw, $k$, near its inner end, and with a fulcrum-screw, $l$, near its outer end, which latter is adjustable in a slot, $m$, in the galley. The inner or free end of the side plate is pressed up against the first or inner line of the column of types by a strong spring, $n$. (See Figs. 1 and 4.) From the inner edge of the side plate projects a lip, $o$, (see Figs. 4, 7, and 8,) which bears against that line of the column next to the line of type being fed by the line-feeder, so that the full pressure of the spring $n$ is brought to bear on said first line, and that this line is held tight enough to form the inner wall of the type-channel, and also to neutralize the action of the spring $b$ and prevent the column of types from pressing against the line-feeder and prevent its free action on its return motion. The subsequent line in the column is prevented from tumbling over and catching against the lip $o$ by a weak spring, $o^*$, (see Figs. 4, 7, and 8,) which is secured to the edge of the side plate, as shown particularly in Fig. 8. By this arrangement I am enabled to dispense with the operation of lifting the lines one after the other from the galley up into a type-channel, since the first line of the column itself is made to form a portion of the inner wall of the type-channel, through which the lines are fed to the distributing mechanism. E is the line-feeder, which slides on the outer wall of the type-channel $a$, and the motion of which is produced by a mechanism shown in detail in Figs. 9 to 18, inclusive. The line-feeder connects, by a cord, $o^0$, with a weight, G, (see Figs. 1, 2, 3, 10, and 15,) and it is provided with a lip, $p$, (see Figs. 3, 4, and 6,) which serves to release the column side plate by striking against a nose, $q$, projecting from the outer edge of said plate, whenever the line-feeder is allowed to follow the action of its weight G. Whenever a new line is to be fed in the type-channel $a$ the line-feeder flies back, and as the lip $p$ strikes the nose $q$ the column side plate is forced back against the action of its spring $n$ and the first line of the column is released, so that the whole column can follow the action of the column-feeder.

If the machine is to be used for distributing "leaded" matter, I attach to the line-feeder E a hook spring or lever, $r$, (see Fig. 6,) and as the line-feeder moves forward beyond the first line in the column the hook-spring catches over the lead in front of said first line, and when the line-feeder is drawn back by the action of its weight G the lead is thrown out before the column side plate is released. The hook-spring $r$ is situated in a recess provided in the inner edge of the line-feeder; and if the matter to be distributed is not leaded said hook-spring must be taken off or fastened back flush with the face of the line-feeder. The line-feeder is moved forward by a feed-pawl, $s$, which is attached to the upper end of a lever, $t$, (best seen in Figs. 9, 15, and 16,) that has its fulcrum on a pivot, $u$, and is drawn up toward a cam, $v$, by the action of a spring, $w$. At the moment one of the recesses of this cam comes opposite the friction-roller at the bottom end of the lever $t$ the spring $w$ causes the line-feeder to advance as far as the abutment at the extreme end of the type-channel will allow, and as the motion of the cam proceeds the feed-pawl is drawn back ready for a new forward motion, the line-feeder being retained in the mean time by a stop-pawl, $x$, which swings on a pivot, $y$, secured in a bracket, $z$, Fig. 9, which is firmly secured to the outer wall of the type-channel.

With the stop-pawl is rigidly connected a lever, $a^1$, the lower end of which is bent at right angles and comes close up to the lower end of a swivel-bar, $b^1$, which is pivoted to the feed-lever $t$. The feed-pawl engages with a rack on the line-feeder, and it is firmly secured to the inner end of a pin, $c^1$, which turns loosely in the feed-lever, and on which are also firmly mounted a cam-disk, $d^1$, and a weighted arm, $e^1$. While the line-feeder is feeding the several parts occupy the position shown in Fig. 9, the feed-pawl being held in gear with the rack of the line-feeder by the inherent gravity of the weighted arm $e^1$, while the shoulder $f^1$ of the cam-disk $d^1$ stands at a little distance from the upper end of the swivel-bar $b^1$. When the line-feeder has been pushed forward so that it strikes the stop-pin $g^1$, (see Fig. 15,) and the feed-lever is thrown in the position shown in that figure, then the feed-pawl is carried down by the weighted arm $e^1$ behind the rear end of the line-feeder, being retained in that position by the shoulder of the cam-disk coming in contact with the upper end of the swivel-bar $b^1$. When the cam $v$ reaches the position shown in Fig. 16 the feed-lever $t$ is free to follow the action of the spring $w$, and the feed-pawl, being thrown in contact with the rear end of the line-feeder, is thrown down, causing the cam-disk $d^1$ to turn, and by the action of the cam-disk the swivel-bar $b^1$ is turned on its pivot, and by its action against the end of the lever $a^1$ the stop-pawl $x$ is thrown out of contact with the ratchet-teeth of the line-feeder, the force of the spring $w$ being sufficient to overcome the power of the weight G, which has a tendency to retain the stop-pawl in gear with said ratchet-teeth in addition to the power of the spring $a^*$, which acts on the lever $a^1$ of the stop-pawl. (See Figs. 9, 15, and 16.) As soon as the stop-pawl is thrown out of gear the line-feeder is free to follow the action of its weight G, and it moves back with considerable speed, carrying the feed-pawl and its weighted arm round to the position shown in Fig. 17, the feed-pawl being provided with a shoulder, $h^1$, whereby the line-feeder is enabled to act thereon until the weighted arm is thrown beyond the center of gravity, as shown in said figure, so that it is caused to drop down to the position shown in Fig. 12. In this position the feed-pawl is retained by a stop-pin, $i^1$, which is secured in the cam-disk $d^1$, and which catches up against a hook, $j^1$, formed at the top end of a lever, $k^1$, which is pivoted to a lug projecting from the side of the feed-lever, and which is kept in position to catch the stop-pin $i^1$ by a weak spring, $l^1$. (See Fig. 16.) In order to allow this stop-pin to pass the head of the feed-lever a segmental groove, $l^*$, is made therein, (see Figs. 11, 12, 13, and 14,) and the end of this groove is covered by a spring, $m^1$, which allows the stop-pin to pass out, but prevents it from returning, and thereby the feed-pawl and its weighted arm are prevented from rebounding.

In Figs. 9 and 11 the feed-pawl is shown in operation. Figs. 12 and 18 show the same in position after it has swung round and the stop-pin has been caught by the hook $j^1$, the spring $m^1$ preventing its rebounding. Fig. 14 shows the stop-pin just in position of being released by the tappet $n^1$, as will be presently explained; and Fig. 13 is a sectional view of the feed-lever, showing the groove $l^*$ and stop-pin $i^1$ in the cam $d^1$.

By retaining the feed-pawl in the position shown in Fig. 12 the line-feeder has time to move clear back to make room for the subsequent line, and when it has reached this position a tappet, $n^1$, which is secured in its sides, strikes the hook-lever $k^1$, (see Figs. 14 and 18,) and by pushing this lever back the stop-pin $i^1$ is released and the feed-pawl is permitted to drop down in gear with the ratchet-edge of the line-feeder, so that the operation of this feeding device again starts into action as before. The tappet $n^1$, which releases the hook-lever $k^1$, is made adjustable on the line-feeder, so that the same can be accommodated to columns of different widths. The weighted arm $e^1$ may also be made adjustable by means of holes in the cam-disk $d^1$ or otherwise, so that the angle between the said arm and the feed-pawl can be changed to accomplish the desired result. The cord $o^0$, which extends from the line-feeder to the weight G, is not rigidly attached to said weight, but it is fastened to a follower, $o^1$, which is fitted into the body of the weight, (see Fig. 15,) and which bears on a spring, $p^1$, placed in the interior of said weight, so that when the line-feeder moves back the cord is not exposed to a sudden strain, the follower $o^1$ being able to yield, and thereby the cord, which otherwise would be liable to snap, is preserved for a long time. For the purpose of arresting the action of the feed-lever $t$ and to stop the feed, a lever, $v^*$, is pivoted to the frame A, and by turning this lever so that it bears against an extension, $t^*$, of the feed-lever the feed-lever is forced back clear of the cam $v$. This lever $v^*$ extends under the frame A to the front of the machine so as to be convenient to the attendant, and it is held in position by a latch, $v^0$, seen in Fig. 1. By the action of the line-feeder the types are pushed along in the type-channel $a$, and at the end of the edge of the galley (see Fig. 19) is a spring, $q^1$, the purpose of which is to prevent the last type from tumbling in front of the subsequent line of the column about being fed into the channel $a$ when the line-feeder has gone back under the action of weight G. While passing through the type-channel the types are exposed to the breaker $r^1$, (see Figs. 19 and 3,) which consists of a dog connected to the outer wall of the type-channel by a pivot, $s^1$, and subjected to the action of a lever, $t^1$, which is actuated by a cam, $u^1$. Said lever has its fulcrum on a pivot, $v^1$, (see Fig. 21,) and it is pressed down on its cam by a spring, $w^1$, also shown in Figs. 19, 3, and 1. As the cam revolves the lever is alternately raised by the action of the cam and then it is depressed by the spring, and whenever it is depressed the breaker $r^1$ is forced into the position shown in Fig. 19, and the types are effectually separated one from the other. In order to allow the breaker to act that portion of the inner wall of the type-channel opposite said breaker is made concave, and the central portion is rendered yielding, being made of an elbow-lever, $x^1$, which is pressed in toward the types by a spring, $y^1$. This breaker is indispensable, since the types, after having been printed from, are liable to stick together very hard, and considerable power is required sometimes to separate them. After having passed the breaker $r^1$ the types are exposed to the action of a roller, $z^1$, which is mounted in the end of a lever, $a^2$, (see Figs. 1 and 19,) which is pivoted to the inner wall of the type-channel and pressed down upon the heads of the types by a spring, $b^2$. One object of this roller is to keep the types down upon the bottom of the type-channel and to press down such of the types as may have been raised while passing the breaker, or otherwise. A similar roller, $c^2$, is made to act upon the types between the galley and the breaker, as shown in Figs. 1, 2, and 3, to prevent the upper edge of the types from leaning over toward the cone. The mouth of the type-channel $a$ is closed by an abutment, $d^2$, shown in Figs. 19, 27, and 28, against which the first type in the line is pushed by the action of the line-feeder.

In order to allow the line-feeder to perform its functions with ease and yet retain the types firmly in position at the required moment, that portion of the outer wall between the breaker $r^1$ and the abutment $d^2$ is made movable, being composed of an arm, $e^2$, which swings on the pivot $s^1$ of the breaker, and which is actuated by a lever, $f^2$, and a cam, $g^2$, (see Figs. 19 and 21,) the lever $f^2$ being made to turn on the pivot $v^1$, Fig. 21, and being depressed upon the face of its cam $g^2$ by a weight, $h^2$, (see Fig. 1,) which is secured to a rod, $i^{21}$, suspended from the end of the lever, as shown in Fig. 21. When the lever is raised by the cam $g^2$ the arm $e^2$ releases the types in the type-channel, being drawn out by a spring, $l^2$, as shown in Figs. 19 and 21, and when the lever is allowed to follow the action of its weight $h^2$ the arm $e^2$ is forced in toward the types. In the end of the arm $e^2$, next the abutment $d^2$, is a series of detents, $k^2$, being composed of slides fitted irregularly or otherwise in the arm $e^2$ and pressed in toward the types by springs $j^2$. The object of these detents is to retain the type next to the first type in the line, and said detents are placed in an irregular or other position, one above the other, so that one or more of them are sure to press upon the second type and retain the same, while the first type in the line is lifted up, the motion of the detent-arm being so regulated that the detents and also the free end of the arm $e^2$, which is provided with a tempered end plate, are pressed against the types just before the lifter rises. Before the lifter begins to act, however, the distributing mechanism receives its "signal," whereby the first type, after having been transferred to the distributing mechanism, is caused to pass into its proper type-case. This object is effected as follows: Each type, with the exception of thin spaces, is provided in its edge with one or more nicks, and as a type advances to the abutment $d^2$ one or more of the nick-levers $m^2$ drop into the nicks, except in case of a thin space. These nick-levers are shown in Figs. 19, 21, 22, and 23. They have a common fulcrum on a vertical pivot, $n^2$, and their tails bear against upright intermediate levers $o^2$, one of which corresponds to each of the nick-levers, Fig. 21, and the lower ends of which bear each against one of a series of horizontal levers, $p^2$, which swing on a vertical pivot, $q^2$, and are drawn out against the intermediate levers by means of springs $r^2$. (See Figs. 21, 19, and 3.) By the action of these springs, therefore, the intermediate levers are caused to press against the tails of the nick-levers, imparting to said nick-levers a tendency to turn on their fulcrum so that their points will drop into the nicks of the type opposite to them—that is, the type which is bearing against the abutment $d^2$—whenever they are free to follow the action of the said springs $r^2$. It must be understood that the points of these nick-levers extend toward the second type only the thickness of the thinnest nicked type, otherwise the nick-levers would bear against the second type in some cases and prevent the first type from giving its signal. Each of the types, excepting thin spaces, is also provided with a governing-nick, $s^2$, (see Fig. 24,) which is situated, by preference, at the middle of the type, but which may be located at any convenient spot upon either side of the type, and which is intended to receive the governor $t^2$. This governor is a lever, which has its fulcrum on the pivot $n^2$, secured in a projection of the inner wall of the type-channel $a$, (see Figs. 19 and 21,) and the tail of which is shorter than the tails of the nick-levers, and bent out so as to make room for a pin, $u^2$, which extends up close behind the edge of all the nick-levers, as shown in Fig. 19. In order to steady the governor and to insure its correct position in relation to the the nick-levers, said governor is made E-shaped, as shown in Figs. 22 and 23, and its horizontal top and bottom bars overlap the nick-levers and increase the stability of the fulcrum-pin $n^2$ in the governor. Opposite the tail of the governor is an elbow-lever, $v^2$, which is subjected to the action of a spring, $w^2$, that has a tendency to pull it away from the governor, while a bell-crank lever, $x^2$, Figs. 19 and 20, when moved in the proper direction, causes the elbow-lever $v^2$ to bear against the tail of the governor and to force its point out of the governing-nick. The bell-crank lever $x^2$ is situated close to the side of the breaker-lever $t^1$, and in this breaker-lever is secured a pin, $y^2$, which strikes the bell-crank lever $x^2$ and causes the same to throw the governor out of the governing-nick, and at the same time the pin $u^2$ in the governor recovers all the nick-levers with the intermediate levers $o^2$ and $p^2$. The principal object of the governor, however, is to prevent any of the nick-levers from giving a wrong signal if the first type should, by some accident, be raised, and not be close down and resting upon the bottom of the type-channel. For if the type is not in the correct position the governor is not able to fall in the governing-nick, and the pin $u^2$ prevents either of the nick-levers from falling in any of the nicks which may be opposite its point; and since the governing-nicks and the point of the governor are much wider than the signaling-nicks, the governor is not able to fall in any of the signaling-nicks, and therefore it cannot fall in at all unless the type is in the correct position; therefore it is impossible to give wrong signals. In case the first type is raised, it merely gets the signal of a thin space and is deposited in the thin-space channel. The bell-crank lever $x^2$ has its fulcrum on a pivot, $z^2$, (see Fig. 20,) which is firmly secured in a bracket rising from the platform which supports the galley and the type-channel $a$, and the motion of the breaker-lever is so timed that, by its action on the bell-crank lever $x^2$, the governor, and consequently all the nick-levers, are recovered before the lifter begins to take action on the type; but previous to the time when the governor is recovered the signal of the nick-levers is transmitted to the distributer in the following manner: On the end of each of the levers $p^2$, Figs. 19, 21, and 22, is an inclined plane, $a^3$, said levers being bent at right angles, as shown in Fig. 19, while the form of the inclines is best seen in Fig. 21. These inclines stand opposite to a series of fingers, $b^3$, which are secured, by pivots $c^3$, to the distributers $d^3$, so that they turn freely up or down, Fig. 22, but are retained by friction in any position which they may assume, their movements being limited by small pins $d^0$, Fig. 22. The distributers are secured to a wheel which has an intermittent rotary motion, and just in front of the inclines $a^3$ is a series of recovering-inclines, $e^3$, Fig. 21, which are secured in a frame firmly secured in the parts which support the type-channel, and which slope down in opposite direction to the signal-inclines $a^3$, so that the fingers of the distributers, in passing those recovering-inclines, will have their outer ends thrown in their lower position. If one or more of the nick-levers fall in nicks in the first type in the type-channel, the corresponding signaling-inclines are thrown out in the path of the fingers $b^3$ of the distributers, (see Fig. 22,) and as a distributer passes said inclines the corresponding fingers are turned, as seen in said figure, where, counting from the bottom, the second and sixth fingers of the distributer are being turned up, while the remaining fingers pass the corresponding inclines without coming in contact with them.

From the foregoing description it will be seen that the incline-levers $p^2$ are pivoted at their ends, whereby the same are enabled to swing in and out without being liable to stick or to be retarded in their motion by friction, which is inevitable if said levers are made in the form of slides.

Figure 25:
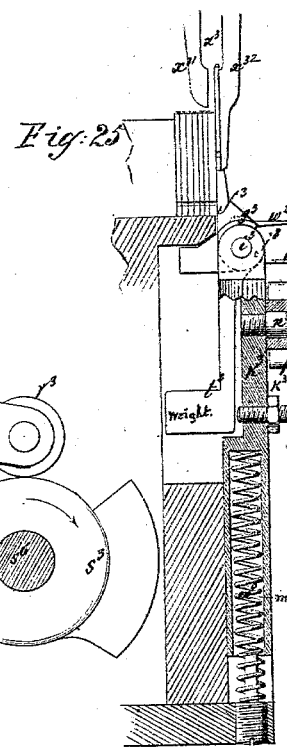
Figure 26:
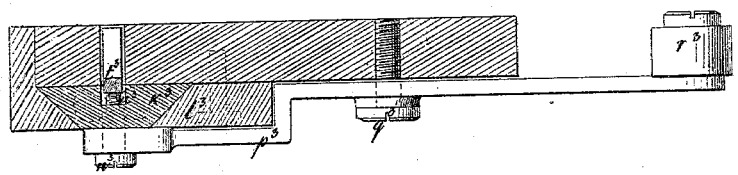

By inspecting Fig. 19 it will be seen that the signaling-inclines are in front of the type-channel $a$, the distributers moving past said inclines in the direction of the arrow marked opposite to them, so that each distributer receives a set corresponding to the first letter in the type-channel before it arrives opposite the mouth of said type-channel. As soon as the distributer has passed the signaling-inclines, and before the wheel which carries said distributers moves its next step, the nick-levers and the governor fall back so as to free the type, and said type is lifted up and delivered to the distributer by the following means: The abutment $d^2$ extends only over about half the width of the type-channel, (see Fig. 19,) and close to its inner wall is situated the lifter $f^3$, (best seen in Figs. 21, 24, and 25,) which is made of a narrow piece of steel provided with a flange, $g^3$, capable of receiving a screw, by means of which it is firmly secured to a tubular head, $h^3$. This head swings freely on a pivot, $i^3$, which has its bearings in two lugs, $j^3$, extending from a slide, $k^3$, which moves up and down in a guide, $l^3$, firmly secured to the platform which supports the type-channel and the mechanism connected therewith. Said slide is bored out from below to receive two springs, $m^3$, which have a tendency to drive the same up, and in its face is secured a stud, $n^3$, which forms the support for a journal-box, $o^3$, situated between the bifurcated end of a lever, $p^3$, Fig. 24. This lever has its fulcrum on a pivot, $q^3$, and in its loose end is secured a friction-roller, $r^3$, which bears on the circumference of a cam, $s^3$, being held in contact therewith by the action of the slide-springs $m^3$. As the cam revolves in the direction of the arrow marked thereon in Fig. 24, the slide $k^3$ is depressed so as to carry the point of the lifter below the foot of the first type in the type-channel. From the lower side of the tubular head $h^3$, which carries the lifter, extends a weighted arm, $t^3$; and as soon as the tip of the lifter has passed below the foot of the type the weighted arm $t^3$ drops back, by its inherent gravity, against the end of a set-screw, $u^3$, which is secured in the slide $k^3$, (see Fig. 25,) and the lifter is carried in so as to catch below said first type the thickness only of a thin space; and as the arm $s^3$ allows the loose end of the lever $p^3$ to drop suddenly, the slide, together with the lifter, are carried up instantaneously by the action of the springs $m^3$, and the type is lifted up, as shown in Figs. 24 and 25. The set-screw $u^3$ serves to insure the correct position of the lifter, so that the same cannot be carried to such a position that it will lift more than one type at a time; and the action of the weighted arm $t^3$ is assisted by a spring, $v^3$, which is fastened to a bracket attached to the frame-work which supports the guide $l^3$ of the slide $k^3$, and which spring acts against a lug, $w^3$, secured to the top of the tubular head $h^3$ whenever the slide $k^3$ is depressed. This spring $v^3$, however, acts only when the lifter is very nearly down, or otherwise it would cause the lifter to rub too hard against the type in its downward motion. The form of the lever $p^3$ and of the slide $k^3$, and the position of the weighted arm $t^3$ in relation to the slide, are seen in Fig. 26, which represents a horizontal section of the parts shown in Fig. 24, the line $x^* x^*$ in this figure indicating the plane of section.

Figure 27:
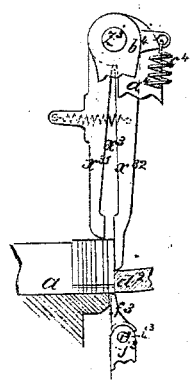
Figure 28:
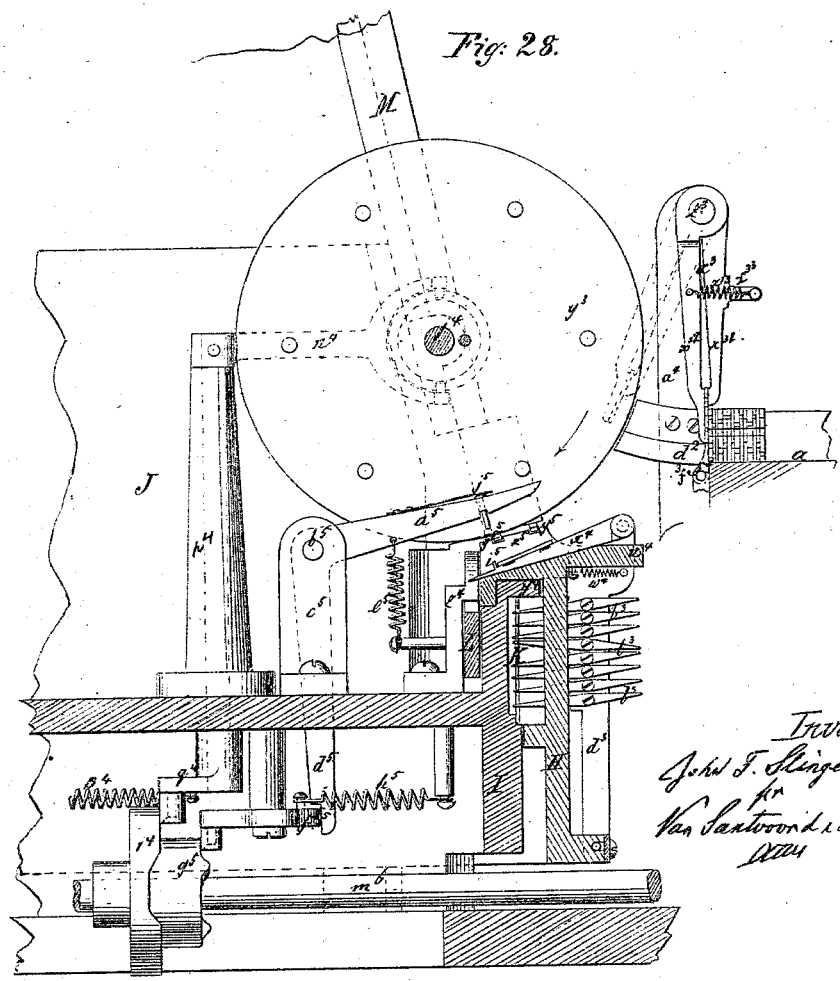
Figure 29:
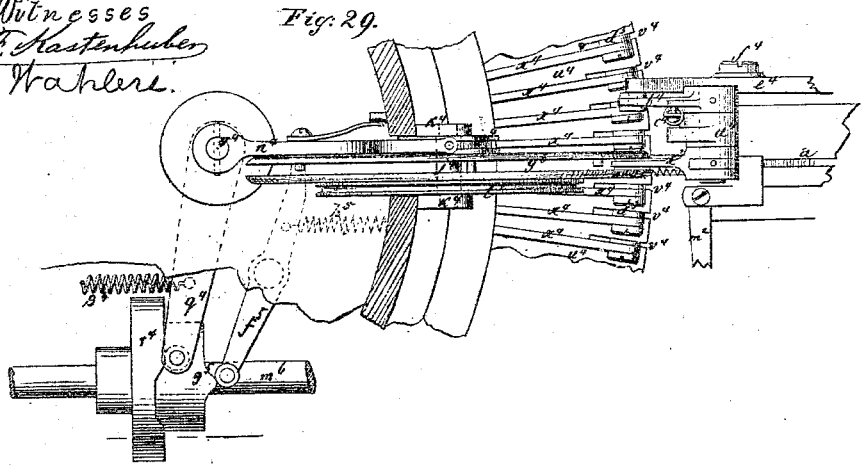

By giving to the lifter an instantaneous upward motion, and with the aid of the breaker and detents $k^2$, also arm $e^2$, the first type in the line is carried up without disturbing the type next to it, which type, being subjected to the action of some of the detents $k^2$, has a tendency to retain its position close down to the bottom of the type-channel. Still, I have found that if the lifter is made to act slowly or gradually the friction between the first type and that next to it is liable occasionally to cause the second type to rise somewhat with the last, whereby the correct operation of the machine would be disturbed; though, on account of the governor, the type thus thrown out of its correct position would not go into any of the ordinary type-cases, but, when delivered to the distributing mechanism, would be passed into the thin-space channel—a channel intended to receive all those type for which neither of the distributers has received a signal; for, by reference to the previous description of the governor, it will be recollected that if a type, when brought to the end of the type-channel and opposite the tips of the governor and the nick-levers, should not be clear down on a level with the bottom of the type-channel, then the governor-nick in said type will not be in position to allow the governor to fall in, neither of the nick-levers is able to fall in, and, consequently, no signal will be given to the distributer passing at that moment to the position opposite to the type-channel, and the type, being subsequently delivered to this distributer, will go into the thin-space channel, as above stated, and as will be hereinafter more fully explained. Immediately after the type has been lifted up, as above described, it is grasped by oscillating nippers $x^3$ and delivered to the rotary conveyer $y^3$, which serves to deposit the same on the distributer standing ready to receive it. These parts are seen in Figs. 1, 2, and 3, and also in detail in Figs. 28 and 29, and partly in Figs. 27 and 30. The nippers $a^3$ are composed of two jaws, $x^{31}$ and $x^{32}$, (see Figs. 27 and 28,) which are mounted on a pin, $z^3$, having its bearing in a standard, $a^4$, which rises from the platform supporting the type-channel $a$ and the parts connected therewith. The pin $z^3$ turns freely in the standard $a^4$, and the jaw $x^{31}$ is firmly secured to said pin, while the jaw $x^{32}$ turns loosely thereon, being drawn up toward the jaw $x^{31}$ by a spring, $x^{33}$. The jaw $x^{32}$ is longer than the jaw $x^{31}$, so that when the nippers swing back over the type the jaw $x^{31}$ passes over its head, while the jaw $x^{32}$ strikes against it. The pin $z^3$ extends through the standard $a^4$, and on its rear end is firmly mounted an elbow-lever, $b^4$, which is subjected to the action of a spring, $c^4$, (see Fig. 2,) by means of which its long arm is held in contact with the friction-roller $d^4$, secured in the upper end of a bell-crank lever, $e^4$, which has its fulcrum on a pivot, $f^4$, and the horizontal arm of which is armed with a friction-roller, $g^4$, which is pressed down upon the surface of a cam, $h^4$, by the action of a spring, $i^4$. When one of the low portions of the cam $h^4$ comes opposite the friction-roller $g^4$, the lever $b^4$, together with the nippers $x^3$, swing back; and as the loose jaw $x^{32}$ strikes the first type in the channel $a$ its motion is arrested, while that of the rigid jaw $x^{31}$ proceeds, and thereby the nippers are opened against the action of their spring $x^{33}$, as shown in Fig. 27. At this moment the action of the lifter $f^3$ takes place, and as the motion of the cam $h^4$ proceeds the bell-crank lever $e^4$ is thrown in the position shown in Fig. 2, and as the jaw $x^{31}$ of the nippers is carried back toward the jaw $x^{32}$, the nippers close up and grasp the type previously lifted by the action of the lifter $f^3$, and then carry it out to the position shown in dotted lines in Fig. 28. By this outward motion of the nippers the type is carried between the two disks of the rotary conveyer $y^3$, and, as the jaws of the nippers are somewhat narrower than the type, and one of the disks of the conveyer closes up, the type is grasped by said disks and withdrawn from the nippers, and then deposited on the distributer, as will be presently explained. The disks of the conveyer $y^3$ are mounted on a shaft, $j^4$, which has its bearings in suitable brackets $k^4$, (see Figs. 2 and 29,) extending from the cone which supports the type-cases; and on one end of said shaft is mounted a belt-wheel, $l^4$, by means of which a very rapid revolving motion is imparted to the conveyer entirely independent of any of the remaining portions of the distributing mechanism, the belt $m^{41}$, used for driving the conveyer, being passed over a pulley on the line-shaft overhead, as indicated in Figs. 1 and 2 of the drawing. One of the disks of the conveyer is firmly on the shaft $j^4$, while the other is connected to the same by means of a feather-key, so that it is compelled to revolve with the shaft, while it is free to slide thereon toward and from the rigid disk. From the outer surface of the sliding disk extends a hub, $m^4$, which is provided with an annular groove to engage with the bifurcated end of a lever, $n^4$, best seen in Figs. 2, 28, and 29, which is mounted on the other end of a vertical rock-shaft, $o^4$, that has its bearing in a column, $p^4$, rising from the platform which supports the type-cone. On the lower end of this shaft is mounted a lever, $q^4$, best seen in Fig. 29, the outer end of which is pressed up against the surface of a cam, $r^4$, by the action of a spring, $s^4$. As the cam $r^4$ revolves an oscillating motion is imparted to the rock-shaft $o^4$, and the loose disk of the conveyer is moved toward and from the rigid disk. The cam $r^4$ is so timed that the disks of the conveyer will close up each time the nippers have swung out to deliver a type to the distributer standing in position to receive it. The distributer $d^3$ consists chiefly of flat metal plates, which are pivoted at their bottom ends to a ring or wheel, H, which embraces the cylindrical base I, on which rests the type-cone J, said wheel H being supported by three or more bolsters, $t^4$, secured to the platform or main frame A. (See Fig. 2 and others.) From the upper edge of the wheel H projects a flange, $u^4$, which is provided with a number of slots, $v^4$, corresponding in number and position to the distributers, and forming the guides for the same, (see Figs. 28 and 29,) and weak springs $w^4$ (see Figs. 3 and 29) have a tendency to draw the distributers inward. On each of the distributers is secured a series of fingers, $b^3$, which receive the signals of the types by the action of the nick-levers $m^2$ and inclines $a^3$, as previously described; and the inner ends of these fingers are opposite a ring, K, which is secured to the base-cylinder I, and which is provided with a system of perforations, a portion of which is shown in Fig. 36. On the circumference of the cone J are secured the type-cases M, into which the types are to be delivered; and the perforations of the ring K under each case corresponds to the signal produced by the nicks in the types which are to go into said type-case. As the fingers on the distributers are also set to correspond to the nicks in the types and to the perforations in the ring K, each distributer, on arriving under that type-case where the perforations of the ring K correspond to its set, is allowed to fall in, and the type previously deposited on said distributer is lifted up in the type-case, as will be hereinafter more fully explained; but, where the perforations of the ring K do not correspond to the set of the distributer, some of the fingers strike the solid portions of the said ring and prevent the distributer from falling in. When a distributer has fallen in it is recovered at the subsequent forward motion of the wheel H by a scalloped rim, $y^4$, formed at the top of the base I, and so constructed that the depressions in said rim are situated one under each type-case, while the projections or raised parts thereof bear against lips $z^{41}$ on the distributers and force the same back against the action of their springs as the motion of the wheel H progresses. A plan of this scalloped rim is shown in Figs. 35 and 37, and a front view of a portion thereof in Fig. 36. To the top of each distributer is pivoted a lifter, $x^4$, which receives the type from the rotary conveyer, as follows: Just below the rotary conveyer the perforated ring K and also the scalloped ring $y^4$ are cut away, as shown in Figs. 30 and 36, so that all the distributers will fall into the position shown in Fig. 30 some time before they arrive under said rotary conveyer; and as a distributer passes under the rotary conveyer the point of the lifter passes up a double-inclined plane, $z^4$, (see Figs. 28, 30, and 31,) which is secured to the platform of the cylindrical base I, the lifter being shown in Fig. 30 as it stands on the apex of the incline just in the act of receiving a type, while in Fig. 28 the lifter has already passed down in the inclined plane after having received a type; and in Fig. 31 I have shown three lifters—one in the act of rising up on the incline, the next as it has reached the apex of the incline, and the last in the act of sliding down on said incline. At the moment the lifter of a distributer has reached the apex of the double incline $z^4$, the type, previously held between the two disks of the rotary conveyer, is knocked down by a hammer, $a^5$, best seen in Figs. 30 and 28. This hammer has its fulcrum on a pivot, $b^5$, secured in a standard, $c^5$, which rises from the platform of the base cylinder I, and from the inner end of said hammer extends a lever, $d^5$; and a spring, $e^5$, which has a tendency to pull the hammer $a^5$ down, holds the lever $d^5$ in contact with the inner end of a horizontal lever, $f^5$, (see Fig. 29,) the outer end of which is drawn up against the surface of a cam, $g^5$, by means of a spring, $h^5$. The cam $g^5$ is so shaped that it allows the hammer to come down only for a very short period of time, and that it raises the same immediately after the type held by the rotary conveyer has been deposited upon the distributer-lifter. On each of these lifters is a shoulder, $i^5$, (see Figs. 28 and 30,) which forms an abutment to prevent the type deposited thereon from sliding down beyond the desired position, and in the hammer is secured a spring-stop, $j^5$, which arrests the type as the same is carried under the spring of the hammer, and if the hammer comes down the spring-stop strikes the shoulder of the lifter and recedes, as shown in Fig. 30, the foot of the type being brought to bear against the shoulder of the lifter.

These devices are of very great importance to insure a correct operation of the distributing mechanism, for, on account of the rapid revolution of the rotary conveyer, the type, on passing below the hammer and being knocked down upon the lifter, would be liable to be carried in by its own momentum beyond the point of the lifter, if it would not be made to catch up either against the spring-stop $j^5$ or the shoulder $i^5$, and thus left on the lifter with its foot bearing against said shoulder in the correct position to be received in the type-case.

As soon as a type has been deposited on the lifter of a distributer, said distributer is carried forward by the motion of the wheel H and the lifter slides down the double incline $z^4$, and as the lip $z^{41}$ of the distributer strikes the next succeeding projection of the scalloped rim $y^4$ the distributer is forced back, so that the inner end of its fingers will clear the perforated ring K; and as the distributer passes the next succeeding depression of the scalloped rim the fingers of the distributer bear against the circumference of the perforated ring, being drawn up against the same by the action of the distributer-spring. If the perforations of the ring K at that point correspond to the set of the finger, the distributer falls in and its type is lifted up in the type-case above; but if the perforations in the ring K do not correspond to the set of the finger the distributer cannot fall in, and it moves on with its type until it arrives under that case where it can fall in for the purpose of delivering its type. The mechanism for raising the distributer-lifters consists of a ring, L, which is fitted loosely in the base cylinder I, (see Figs. 2, 28, 30, and 32,) and which is provided with an annular groove, $k^5$, that stands opposite to the points of the distributer-lifters when said ring is in its lowest position, as shown in Fig. 2, so that whenever one of the distributers falls in the point of its lifters enters said groove. Just below the rotary conveyer, however, a portion of the lifting-ring is cut away to make room for the double-incline $z^4$, as seen in Figs. 30 and 31, so as not to interfere with the operation of the lifter while passing below the rotary conveyer for the purpose of receiving types, as previously described. The lifting-ring rests upon the outer ends of radial levers $l^5$, which have their fulcrums in lugs $m^5$ rising from the platform of the base cylinder, Figs. 3, 2, and 32, and the inner ends of which catch under the head $n^5$ of a central bolt, $o^5$, which is fitted loosely in a socket in the platform of the base cylinder so that it can freely rise and fall. On the top of the head $n^5$ bears a lever, $p^5$, which has its fulcrum on a point, $q^5$, secured in lugs $r^5$, which rise from the platform of the base cylinder, (see Figs. 3 and 32;) and from the lever $p^5$ extends an arm, $s^5$, downward, and a friction-roller, $t^5$, mounted in the lower end of this arm, bears on a cam $u^5$, the weight of the ring L itself serving to keep said friction-roller in contact with the cam. As this cam revolves an oscillating motion is imparted to the lever $p^5$, and the head $n^5$ is alternately depressed and then allowed to rise up, and as the head is depressed the lifting-ring L is raised. By the upward motion of the ring the lifters of all such distributers which have fallen in at that particular moment are carried up, and the types resting on said lifters are forced in the appropriate type-cases M. It is obvious that the upward and downward motion of the lifting-ring must take place at these times, when the distributer-wheel remains stationary; but the mechanism whereby these motions are produced is so simple that it will be readily understood by the previous description. The type-cases M are secured to the circumference of the cone J, the lower portion of which is made of cast-iron, while its upper portion is made of wood, and said type-cases are secured to the cone in such a manner that they can be readily taken off when filled and transferred to the cone of the setting-machine; or the types can be lifted out as best suits the attendant. On the bottom of each type-case is a spout or mouth-piece, N, which is provided with two or more spring-catches, $v^5$, (see Figs. 33 and 34,) and with a wiper, $w^5$. The spring-catches are secured to the sides of the spouts N, two or more on each side, and their lower hook-shaped ends face each other, as seen in Fig. 33, so that, if a type is pressed up between them said catches spread to allow the type to pass, and after it has passed the shoulders of the hooks the catches close and retain the type.

In order to enable the catches to perform their function without fail, the distributer-lifters opposite these hooks are chamfered off toward their upper surfaces, (see Fig. 33,) so that the types resting thereon project somewhat beyond them, and consequently the spring catches are allowed to catch under the types before they come in contact with the sides of the lifters. The several distributers are separated by radial partitions $x^5$, formed on the upper surface of the distributer-wheel H; and in these partitions are recesses $y^5$, (see Fig. 34,) to allow the bottom ends of the spring-catches $v^5$ to pass, while the top ends of said partitions come close up to the bottom ends of the spouts N. By these means the types are effectually prevented from dropping off from the lifters while they are being pushed up into the type-cases. The spouts N are closed in front by the wipers $w^5$, with their lower ends slightly curved, Figs. 34 and 33, so that they are enabled to catch over the heads of any types which project and to force the feet of the types down on the bottom of the type-cases as said types are being piled up in said cases.

For the ordinary type-cases two spring-catches on each side are sufficient; but on the pi or thin-space case I prefer to use three on each side, so that, if a type gets broken, said spring-catches are able to retain all the pieces within the spout of the pi-case. If only two spring-catches are used and a broken type is lifted into the spout, the pieces of the type are liable to hang down and to interfere with the correct operation of the machine.

Figure 38:
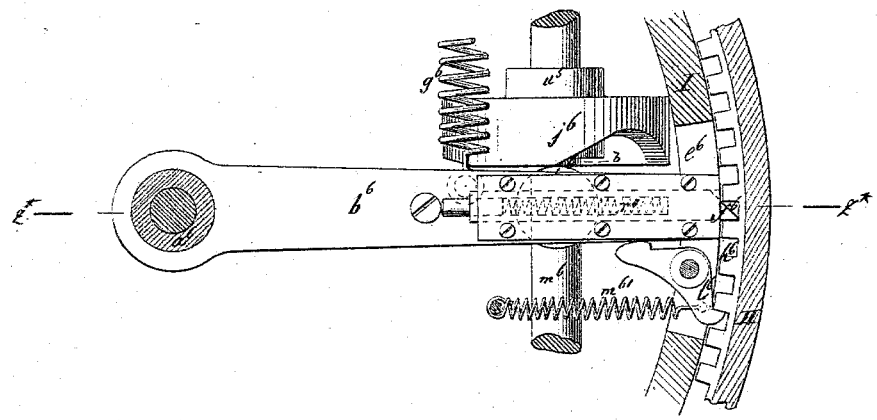
Figure 39:
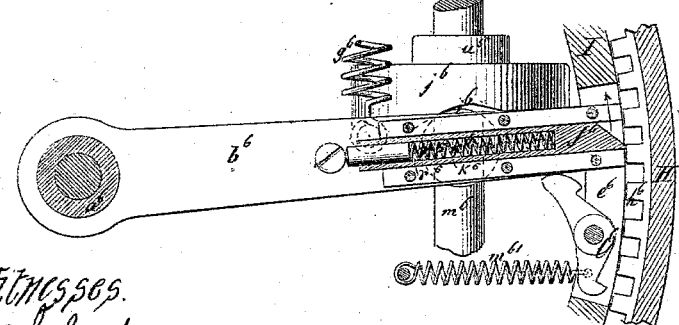
Figure 40:
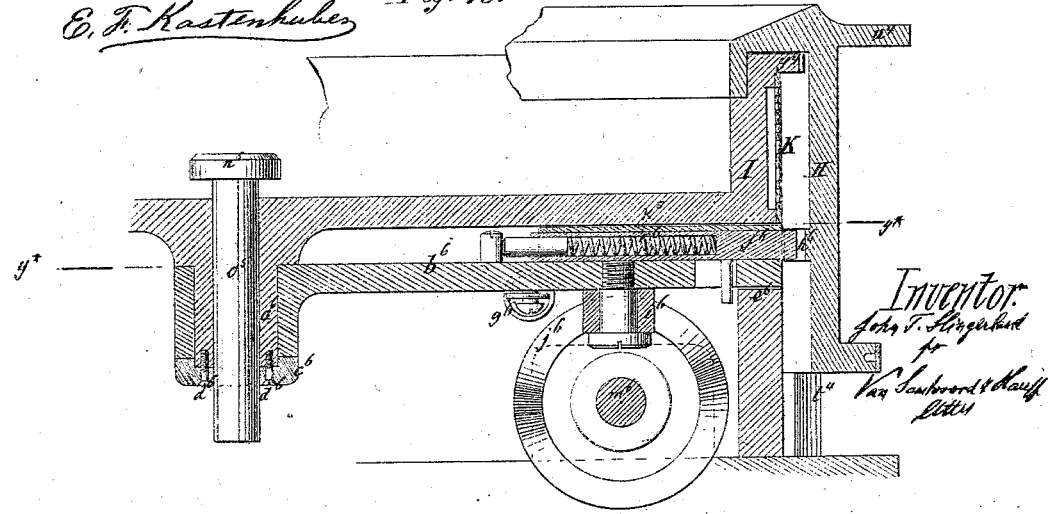

The mechanism which imparts a step-by-step motion to the distributer-wheel H is shown in Figs. 38, 39, and 40, where Figs. 38 and 39 are horizontal sections in the plane $y^* y^*$, Fig. 40, showing two different positions of the working parts, and Fig. 40 is a vertical section in the plane $z^* z^*$, Fig. 38. The platform of the cylindrical base I, Figs. 32 and 40, is provided with a central hub, $a^6$; and on the outside of this hub is fitted a lever, $b^6$, which is retained in position by a ring, $c^6$, and screws $d^6$, Fig. 40, its loose end being guided in a slot, $e^6$, in the base cylinder I. To the upper surface of this lever is secured a bolt, $f^6$, which is inclosed in a case fastened to the bolt-lever, and the outer end or head of which is beveled off, as shown in Figs. 38 and 39, and which is subjected to the action of a spiral spring, $r^6$, which has a tendency to keep its head in gear with cogs $h^6$, formed on a ring in the inner surface of the distributer-wheel H. To the under surface of the lever $b^6$ is secured a friction-roller, $i^6$, which is drawn up against the face of a cam, $j^6$, by a spring, $g^6$, so that by the combined action of the spring and cam an oscillating motion is imparted to the lever $b^6$. In the slot $e^6$ of the base cylinder is secured a stop-pawl, $l^6$, which is subjected to the action of a spring, $m^{61}$, that has a tendency to keep the rounded tail of the pawl in contact with the edge of the bolt-lever $b^6$, and to draw the head of the pawl out of gear with the cogs $h^6$. As soon as the bolt-lever has moved back far enough to allow the latch to drop behind the next succeeding cog its forward motion commences, and the distributer-wheel H is carried forward one step, and as the bolt-lever $b^6$ approaches the forward end of its stroke the stop-pawl $l^6$ is thrown in gear with the cogs $h^6$, and the distributer-wheel is retained firmly in position during the time the distributers receive fresh types and deliver those previously received.

It remains to explain the position of the several cams in relation to the driving-shaft $m^6$. By referring to Figs. 1 and 2 it will be seen that said shaft extends through under the galley and the parts connected therewith, and that on one of its ends is mounted the belt-reel $n^6$. It has its bearings in suitable journal-boxes $o^6$, secured to the main frame A, and near its inner end are mounted thereon the cam $g^5$, which actuates the hammer $a^5$, the cam $r^4$, which actuates the movable jaw of the rotary conveyer $y^3$, the cam $u^5$, which actuates the lever $p^5$ of the lifting-ring L, and the cam $j^6$, which actuates the bolt-lever $b^6$, that serves to impart to the distributer-wheel H the required step-by-step motion. On the shaft $m^6$ is also mounted a cog-wheel, $p^6$, which is geared together by an intermediate gear-wheel, $q^6$, with a wheel, $r^6$, mounted on the end of the shaft $s^6$. The intermediate gear-wheel $q^6$ is mounted on a stud secured in the side of the main frame A. The shaft $s^6$ has its bearings in suitable journal-boxes $t^6$, secured to the platform $u^6$, immediately below the galley B, (see Figs. 1 and 3,) and on it are mounted the cam $u^1$, which actuates the breaker-lever $t^1$, governor-lever $x^2$; also, the cam $g^2$, which actuates the detent-lever $f^2$, the alarm ratchet-wheel $g$, (see Figs. 1 and 5,) and the cam $s^3$, which actuates the lever $p^3$ of the lifter $f^3$. The main shaft $m^6$ is geared together by bevel-wheels $v^6$, Figs. 1, 3, and 9, with a transverse shaft, $w^6$, on which are mounted the cam $v$, which actuates the feed-lever, and also the cam $h^4$, which actuates the oscillating nippers $x^3$, best seen in Fig. 2.

What I claim as new, and desire to secure by Letters Patent, is—

1. The combination, with the column-feeder, of a spring, $b$, pulley-block $e$, and cord $c$, substantially as described.

2. The arrangement, on the column side plate, of a projecting lip, $o$, and sustaining-spring, $o^*$, substantially in the manner shown and described.

3. The combination of the lip $o$, or the column side plate, with the spring $n$, with the first line of types in the galley, and with the type-channel $a$, substantially as set forth.

4. The arrangement of a recess in the line-feeder to receive a hook-shaped spring, $r$, substantially as and for the purpose described.

5. The lip $p$ on the line-feeder, to act on the projection $q$ of the column side plate so as to release said side plate whenever the line-feeder moves back to admit a fresh line in the type-channel, substantially as set forth.

6. The cam-edge $h^1$ on the feed-pawl $s$, in combination with the line-feeder E, feed-lever $t$, and weighted arm $e^1$, substantially as described.

7. The cam-disk $d^1$, in combination with the feed-pawl $s$, weighted arm $e^1$, and stop-pawl $x$, substantially as described.

8. The swivel-bar $b^1$ and lever $a^1$, in combination with the cam-disk $d^1$ and stop-pawl $x$, substantially as set forth.

9. The stop-pin $i^1$ and stop-lever $k^1$, in combination with the feed-pawl $s$ and its weighted arm $e^1$, substantially as described.

10. The spring $m^1$ to prevent the feed-pawl and its weighted arm from rebounding, substantially as set forth.

11. The tappet $n^1$ on the line-feeder, in combination with the stop-lever $k^1$ and feed-pawl $s$, substantially as described.

12. The follower $o^1$ and spring $p^1$ in the weight G, which serves to retract the line-feeder, substantially as set forth.

13. The weighted arm $t^3$, in combination with the lifter $f^3$, constructed and operating substantially as described.

14. The set-screw $w^3$, in combination with the weighted arm $t^3$ and lifter $f^3$, substantially as set forth.

15. The arrangement of a governing-nick, $s^2$, in each type, substantially as described.

16. The governor $t^2$, in combination with the nick-levers $m^2$, substantially as set forth.

17. The governor-stop $u^2$, serving to recover all the nick-levers $m^2$, substantially as described.

18. The incline levers $p^2$, being made to oscillate on a pivot, $q^2$, substantially as set forth.

19. The long loose jaw $x^{32}$ of the nippers $x^3$, to form a yielding abutment for the type, substantially as described.

20. The combination of the nippers $x^3$ with the lifter $f^3$, substantially as described.

21. The rotary conveyer, capable of grasping the types and of depositing them on the distributer-lifters, substantially as set forth.

22. The combination of the rotary conveyer with the oscillating nippers, substantially as described.

23. The hammer $a^5$ for knocking the types out of the rotary conveyer, substantially as set forth.

24. The spring-stop $j^5$ in the hammer $a^5$, substantially as described.

25. The lifter $x^4$, hinged to the distributer $d^3$, substantially as set forth.

26. The combination of the lifter $x^4$, hammer $a^5$, and rotary conveyer $y^3$, substantially as described.

27. The double incline $z^4$, in combination with the lifters $x^4$ and with the rotary conveyer $y^3$, substantially as described.

28. The distributers $d^3$, being hinged at their bottom ends to the wheel H, and provided with fingers $b^3$ at their middle, and with lifters $x^4$ at their top, substantially as set forth.

29. The lifting-ring L, in combination with the distributer-lifters $x^4$, substantially as described.

30. The perforated ring K and distributer-fingers $b^3$, in combination with the groove $k^5$ in the lifting-ring L and with the lifters $x^4$, substantially as set forth.

31. The central bolt $o^5$ and radiating levers $l^5$, in combination with the lifting-ring, substantially as set forth.

32. The arrangement of spring-catches $v^5$ on the opposite sides of the spouts of the type-cases, the tips of said catches being beveled off in opposite directions, substantially as shown and described.

33. The combination of the lifters $x^4$, having their upper edges chamfered off, with the spring-catches $v^5$ on the type-cases, substantially as set forth.

34. The partitions $x^5$, situated between the lifters, and provided with notches to admit the ends of the spring-catches $v^5$, substantially as described.

35. The combination of lifters $x^4$ and lifting-ring L with type-cases M, arranged on the circumference of a cone, substantially as described.

This specification signed by me this 29th day of November, 1870.

JOHN T. SLINGERLAND.

Witnesses:
  W. HAUFF,
  E. F. KASTENHUBER.